United States Patent [19]

Plesinger

[11] Patent Number: 5,030,135
[45] Date of Patent: Jul. 9, 1991

[54] CABLE STRAIN RELIEF DEVICE

[75] Inventor: Boris M. Plesinger, Scottsdale, Ariz.

[73] Assignee: Compaq Computer Corporation, Houston, Tex.

[21] Appl. No.: 620,151

[22] Filed: Nov. 29, 1990

[51] Int. Cl.5 .............................................. H01R 13/56
[52] U.S. Cl. .................................... 439/447; 174/135; 439/449
[58] Field of Search .......................... 174/135, 152 G; 439/445, 447, 449, 474, 604, 606

[56] References Cited

U.S. PATENT DOCUMENTS

| | | | |
|---|---|---|---|
| 2,209,814 | 7/1940 | Finger | 439/447 |
| 2,367,996 | 1/1945 | Clark et al. | 439/447 |
| 2,421,155 | 5/1947 | Miller et al. | 439/449 X |
| 2,508,638 | 5/1950 | Bricker | 439/447 |
| 3,366,917 | 1/1968 | Karol | 439/447 |
| 4,082,422 | 4/1978 | Kloots | 439/447 X |
| 4,203,004 | 5/1980 | Cox | 439/445 X |
| 4,461,529 | 7/1984 | Fariss | 439/604 |
| 4,718,860 | 1/1988 | Gobets et al. | 439/447 |

FOREIGN PATENT DOCUMENTS 683272  1/1940  Fed. Rep. of Germany ...... 439/447

Primary Examiner—Laramie E. Askin
Attorney, Agent, or Firm—Johnson & Gibbs

[57] ABSTRACT

An improved strain relief device is connectable to a cable end portion to resiliently resist both bending and torsional loads imposed thereon. The strain relief device is formed from a resilient material and includes a tubular body portion which receives and is fixedly secured to the cable end portion to be protected. Projecting radially outwardly from the outer side surface of the tubular body are a circumferentially spaced series of elongated, resilient rib members which extend lengthwise in a direction parallel to the axis of the strain relief body. The ribs taper radially outwardly along their lengths and collectively function to progressively resist both bending and torsional loads imposed upon the cable end portion in a manner maintaining a generally linear relationship between the bending and torsional loads on the cable end portion and the resulting axial lengths of the strain relief body portion being bent or twisted. In a preferred embodiment of the strain relief device, an electrical connector member is formed integrally with one end of the strain relief body and may be operatively connected to the complementarily configured electrical connector structure to conductively link the same to the cable end portion protected by the externally ribbed strain relief body.

20 Claims, 2 Drawing Sheets

CABLE STRAIN RELIEF DEVICE

BACKGROUND OF THE INVENTION

1. Field of the Invention

The present invention generally relates to strain relief devices for protecting cable end portions, and in a preferred embodiment thereof, more particularly relates to an improved strain relief device for protecting such cable end portions from damage due to both bending and torsional forces imposed thereon.

2. Description of Related Art

To protect the end portions of electrical cables and the like against damage thereto arising from flexural forces imposed thereon, it is now a common practice to attach to such cable end portions small devices known as "strain reliefs". The typical strain relief that is conventionally utilized in this protective application is generally of an elongated tubular configuration, coaxially receives the cable end portion to be protected, and resiliently flexes in response to bending forces imposed on the cable end to function as a shock absorber of sorts that resiliently resists cable end bending. Conventional strain reliefs of this general type are widely used on a variety of electrical products to which a power supply cable is operatively connected, such as a power hand tools, irons, toasters, computer components and the like.

While the resiliency of the typical cable strain relief of conventional construction generally does a creditable job of protecting its associated cable end portion from flexure damage, the conventionally configured strain relief is typically subject to a variety of well-known problems, limitations and disadvantages. For example, tubular strain reliefs with a uniform annular cross-section along their lengths provide an undesirably nonlinear resistance to transverse bending loads upon the cable end portion which they encircle. To achieve a more desirable, generally linearly progressive resistance to such transverse bending loads on the cable end portion, the bodies of many conventional strain reliefs have been given a conically tapered configuration along their lengths in an attempt to provide this progressive bending resistance along the length of the strain relief.

While this tapered body configuration tends to yield the desired progressive bending resistance, it is often the case that the conventional strain relief of this axially tapered body configuration rather loosely receives its associated cable end portions. Accordingly, this type of conventional strain relief does not protect its associated cable end portion from torsional twisting loads imposed thereon—the cable end portion can be simply twisted about its axis relative to the outwardly encircling strain relief.

In an attempt to solve this problem, various conventional strain reliefs having axially tapered bodies have been fixedly secured in one manner or another to the outer side surface of the cable end portion which they are designed to protect. When fixedly secured to the cable end portion in this manner, the axially tapered strain relief resiliently resists twisting loads imposed upon the cable end portion. However, unlike the transverse bending resistance that the strain relief provides, the torsional twisting resistance that it provides is not linearly progressive along its length. Stated otherwise, the rate of increase of the axial length of the strain relief body being twisted in response to, for example, a uniformly increasing torsional load on the cable end portion slows considerably. Accordingly, the torsional "stiffness" along the length of the tapered strain relief body does not, as would be desirable, linearly track the increasing torsional load on the cable end portion.

From the foregoing it can be seen that it would be desirable to provide a cable stain relief device which, in a generally linearly progressive manner along the strain relief length, resiliently resists both torsional and transverse bending loads imposed upon the cable end portion to which the strain relief is operatively attached. It is accordingly an object of the present invention to provide a strain relief device having these dual protective characteristics.

SUMMARY OF THE INVENTION

In carrying out principles of the present invention, in accordance with a preferred embodiment thereof, an improved strain relief device is provided for attachment to an electrical cable end portion to resiliently resist both torsional and transverse bending loads imposed on the cable end portion. The strain relief is uniquely constructed in a manner such that, along its length, it resiliently resists such torsional and transverse bending loads in a progressive, generally linear fashion.

In its preferred embodiment, the strain relief device of the present invention includes a tubular body portion that coaxially circumscribes the cable end portion to be protected, and means are provided for fixedly securing the strain relief body to the outer side of the cable end portion which it protects. This fixed attachment of the strain relief body to the cable end portion may be achieved in a variety of suitable manners such as by an adhesive material, a sonic welding process or the like. Preferably, however, the strain relief body is co-molded with the insulative outer jacket of the cable end portion.

Projecting radially outwardly from the outer side surface of the tubular strain relief body are a circumferentially spaced series of elongated, resilient rib members which extend lengthwise in a direction parallel to the axis of the strain relief body. The ribs are spaced around the entire periphery of the strain relief body and taper radially outwardly along their lengths from similarly facing first ends of the ribs to their oppositely facing second ends.

When the cable end portion within the strain relief body is subjected to a transverse bending load, the strain relief body and the ribs thereon progressively bend along their lengths in a manner such that they resiliently resist the bending of the cable end portion, along the lengths of the ribs from their first ends toward their second ends, in a generally linear fashion. Thus, for example, if the bending load on the cable end portion is doubled, the axial length of the ribbed strain relief body which is responsively bent is generally doubled as well.

Importantly, the provision of these longitudinally tapered ribs on the strain relief body also affords the strain relief this desirable linear resilient resistance characteristic in a torsion mode. Accordingly, for example, if the torsional load on the cable end portion is doubled, the axial length of the ribbed strain relief body being twistingly deformed about its axis is generally doubled as well. The longitudinally tapered ribs thus act in a beam-like fashion to desirably provide the improved strain relief device with a generally linear, axially progressive resilient resistance force characteristic in both the torsional and transverse bending deformation modes thereof.

In an illustrated preferred embodiment of the strain relief device, a connector portion (which may be of either a male or female configuration) is formed integrally with an outer end of the ribbed strain relief body and may be operatively and removably secured to a complementary connector member on a device which is to be conductively linked to the protected cable end portion.

DETAILED DESCRIPTION OF THE INVENTION

Figure 1:
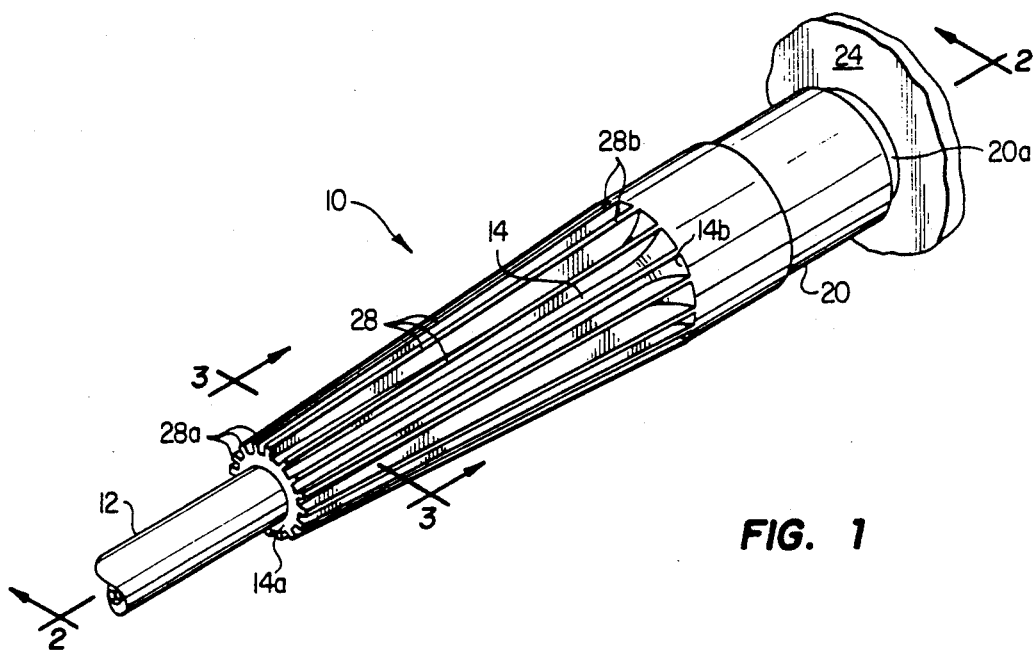
FIG. 1 is a perspective view of a strain relief/connector device which embodies principles of the present invention and is protectively secured to a cable end portion and removably attached to a complementary connector member.
Figure 2:
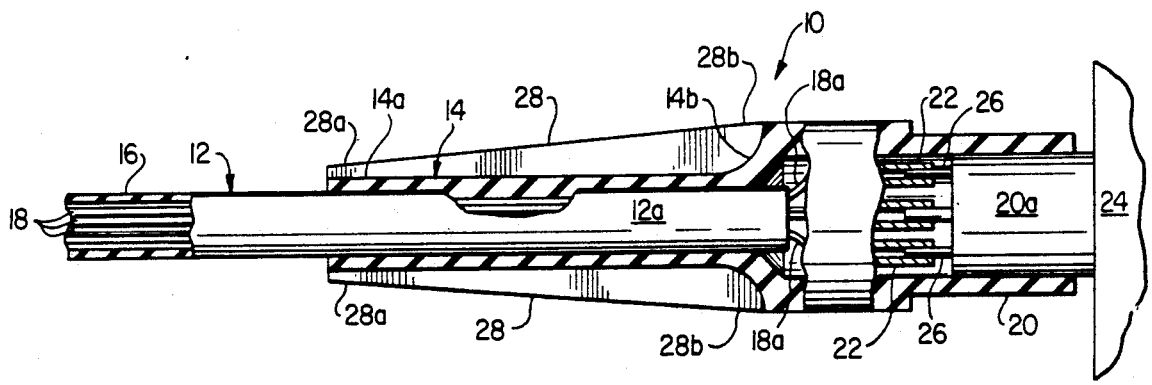
FIG. 2 is an enlarged scale, partially elevational cross-sectional view through the FIG. 1 apparatus taken along line 2—2 of FIG. 1.
Figure 3:
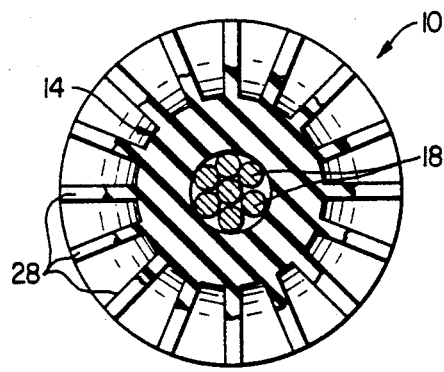
FIG. 3 is an enlarged scale cross-sectional view through the strain relief/connector device taken along line 3—3 of FIG. 1.
Figure 4:
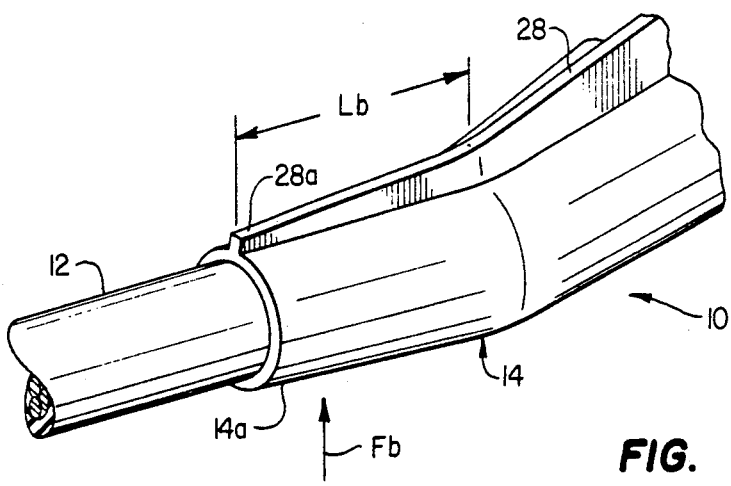
FIG. 4 is an enlarged scale perspective view of a body portion of the device, with all but one of its external ribs being removed for illustrative purposes, being transversely bent in response to a tranverse bending load on the cable end portion.

With initial reference to FIGS. 1-3 of the drawings, the present invention provides a uniquely configured and operative strain relief device 10 which is connectable to an end portion $12_a$ of an electrical cable 12 and protects the cable end portion $12_a$ by resiliently resisting, in a unique manner subsequently described, both torsional and transverse bending forces imposed upon the cable end portion. The device 10 is formed from a suitably resilient, electrically insulative material, such as polyurethane or rubber, and includes a tubular body 14 having a front end portion $14_a$ through which the cable end portion $12_a$ inwardly passes, and a radially outwardly flared rear end portion $14_b$.

The cable 12 has a hollow tubular outer insulating jacket 16 through which a series of electrically conductive wires 18 longitudinally pass. Along its length, the interior side surface of the body 14 is fixedly secured to the outer jacket section of the cable end portion $12_a$. This may be achieved in a variety of manners, including adhesively bonding the body 14 to the cable end portion $12_a$ or using an ultrasonic welding process to effect the permanent interconnection between these two elements. However, as illustrated in FIG. 3, the body 14 and the cable insulating jacket 16 may also be formed from the same moldable material and co-molded with one another for purposes of fabrication cost efficiency.

Co-molded with, or otherwise fixedly secured to the body end portion $14_b$ is a hollow cylindrical connector portion 20 having a series of electrical connection socket members 22 secured therein in a conventional manner. The socket members 22 are electrically connected to the wire end portions $18_a$ exiting the cable end portion $12_a$. As illustrated in FIG. 2, the connector portion 20 is co-axially and removably connectable to a complementarily configured electrical connector member $20_a$ secured to a stationary portion 24 of an electrical device with which the cable 12 is to be conductively linked.

Upon the interconnection between the complementary connector portions 20 and $20_a$, a series of pins, 26 projecting outwardly from the connector member $20_a$, are operatively forced into the socket members 22. As depicted, the connector portion 20 of the device 10 is of a female configuration, while the complementary connector $20_a$ is of a male configuration. It will be appreciated, however, that the device portion 20 could be a male connector member and the complementary connector $20_a$ could be a female connector.

Molded integrally with the resilient body 14 are a series of elongated, resilient rib means, representatively in the form of ribs 28 which are circumferentially spaced around and project radially outwardly from the outer side surface of the body 14. Each of the ribs 28 has a front end $28_a$ positioned on the front end portion $14_a$ of the body 14, and a rear end portion $28_b$ positioned on the rear end portion $14_b$ of the body 14. As may best be seen in FIG. 2, each of the ribs 28 tapers radially outwardly at a uniform rate from its front end $28_a$ to its rear end $28_b$.

Figure 5:
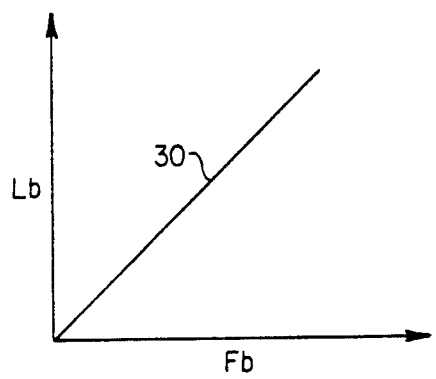
FIG. 5 is a graph illustrating the generally linear relationship between the cable bending force $F_b$ and the axial length $L_b$ of the strain relief body portion being correspondingly bent in FIG. 4.

As will now be described in conjunction with FIGS. 4-7, the longitudinally extending tapered external ribs 28 function as strain control means for controlling the torsional and bending flexure of the strain relief body 14 in a progressive, generally linear fashion. As representatively depicted in FIG. 4, an upwardly directed transverse bending force $F_b$ imposed on the cable end portion within the strain relief body 14 causes an upward bending of a front end portion of the strain relief body 14 having an axial length $L_b$. Importantly, as schematically shown in the graph of FIG. 5, the progressively tapered ribs 28 function to maintain a generally linear relationship, illustrated by the graph line 30, between the magnitude of a particular bending force $F_b$ and the resulting axial length $L_b$ (measured rearwardly from the front end of the body 14) of the corresponding body portion which is bent as a result of the force $F_b$. Because the series of ribs 28 are spaced around the entire periphery of the body 14, this desirable linear relationship between the bending force $F_b$ and the bent body length $L_b$ is maintained regardless of the direction of the transverse bending force relative to the body axis.

Figure 6:
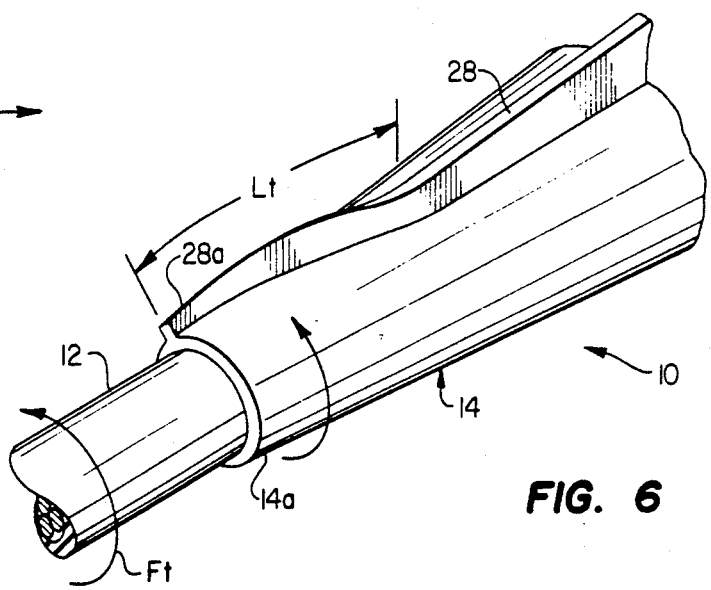
FIG. 6 is an enlarged scale perspective view of a body portion of the device, with all but one of its external ribs being removed for illustrative purposes, being twisted about its axis in response to a torsional load on the cable end portion.
Figure 7:
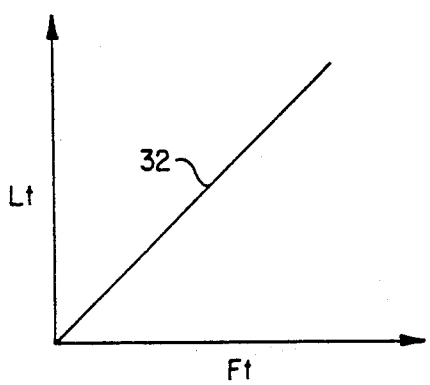
FIG. 7 is a graph illustrating the generally linear relationship between the cable torsional force $F_t$ and the axial length $L_t$ of the strain relief body portion being correspondingly twisted about its axis in FIG. 6.

As illustrated in FIG. 6, a torsional force $F_t$ imposed upon the cable end portion $12_a$ correspondingly twists a front end portion of the body 14 having an axial length $L_t$. Quite uniquely, the ribs 28 also function to maintain a generally linear relationship between the magnitude of the torsional force $F_t$ and the resultant axial length $L_t$ (measured from the front end of the body 14) of the body 14 which is twistingly deformed, as generally illustrated by the graph line 32 in FIG. 7.

It can be seen from the foregoing that the circumferentially spaced, longitudinally extending tapered ribs 28 provide, in a beam-like fashion, a progressively increasing resilient resistant force, to both torsional and bending loads imposed on the cable end portion 12$_a$, which is generally linearly related to the cable end portion deformation force in both torsional and bending deformation modes. Compared to strain relief devices of conventional configuration and operation, the strain relief device 10 of the present invention thus provides for the significantly improved strain protection of the cable end portion 12$_a$. Despite its improvements from a cable protection standpoint, the strain relief device 10 of the present invention is of a simple, easy to manufacture construction and may be formed as a single molded unit which, as previously described, may be molded integrally with the jacket section of the cable end portion to be protected.

The foregoing detailed description is to be clearly understood as being given by way of illustration and example only, the spirit and scope of the present invention being limited solely by the appended claims.

What is claim:

1. Strain relief apparatus for protecting an electrical cable end portion having an outer side surface, comprising:
   a generally tubular hollow body formed from a resilient material and adapted to coaxially receive said cable end portion, said body having first and second opposite end portions, and inner and outer side surfaces;
   means for fixedly securing said inner side surface of said body to said outer side surface of said electrical cable end portion along generally the entire axial length of said inner side surface of said body; and
   a circumferentially spaced series of elongated external resilient rib means secured to said body, each laterally projecting edgewise in a spline-like manner radially outwardly from said outer side surface of said body, and extending lengthwise between said first and second end portions of said body, said rib means being tapered along their lengths, axially and radially relative to said body, and, with said cable end portion fixed within said body, functioning to provide said strain relief apparatus with a generally uniform bending resistance in all transverse directions and to cause said strain relief apparatus to resiliently resist both torsional and transverse bending forces imposed on said cable end portion in a manner such that:
   (1) a generally linear relationship is maintained between the magnitude of a transverse bending force imposed on said cable end portion and the axial length of said body which, in response to the transverse bending force, is bendingly deformed, said generally linear relationship being uniformly maintained generally irrespective of the direction of the transverse bending force, and
   (2) a generally linear relationship is maintained between the magnitude of a torsional force imposed on said cable end portion and the axial length of said body which, in response to the torsional force, is torsionally deformed.

2. The strain relief apparatus of claim 1 wherein:
said series of resilient rib means are circumferentially spaced around the entire periphery of said outer side surface of said body.

3. The strain relief apparatus of claim 1 wherein:
said series of resilient rib means are formed integrally with said body.

4. The strain relief apparatus of claim 1 wherein:
said cable end portion, when operatively received within said body, extends inwardly through said first end portion of said body,
said rib means have first and second ends respectively positioned on said first and second end portions of said body, and
said rib means progressively taper radially outwardly from their first ends to their second ends.

5. The strain relief apparatus of claim 4 wherein:
the radially outward tapers of said rib means are generally uniform along their lengths.

6. The strain relief apparatus of claim 1 wherein:
said cable end portion, when operatively received within said body, extends inwardly through said first end portion of said body, and
said strain relief apparatus further comprises a connector member secured to said second end portion of said body and being removably attachable to a complementary connector member to conductively link said cable end portion to said complementary connector member.

7. The strain relief apparatus of claim 6 wherein:
said connector member has a connector body portion, and
said connector body portion is formed integrally with said second end portion of said body.

8. Apparatus for operatively connecting an end portion of an electrical cable to an electrical connector member, and for resiliently resisting torsional and transverse bending forces imposed on said cable end portion, said cable having a hollow tubular insulating jacket through the interior of which a plurality of electrically conductive wires longitudinally extend, said apparatus comprising:
   a resilient strain relief portion including a hollow, cylindrical body adapted to coaxially receive and be fixedly secured to said cable end portion, said body having inner and outer side surfaces, a first end portion through which said cable end portion, when operatively received in said body, inwardly extends; and a second end portion; and a series of radially outwardly projecting elongated ribs formed on said outer side surface of said body and circumferentially spaced apart around the periphery thereof, said ribs longitudinally extending along the length of said body and having first ends positioned on said first end portion of said body and second ends positioned on said second end portion of said body, said ribs uniformly tapering radially outwardly, from their first ends to their second ends, relative to said cylindrical body; and
   connector means secured to said second end portion of said body and being removably attachable to said connector member to conductively link the wires in said cable end portion to said connector member.

9. The apparatus of claim 8 wherein:
said connector means include a connector body formed integrally with said strain relief portion of said apparatus.

10. Electrical cable apparatus comprising:
an electrical cable having a hollow tubular insulating jacket through the interior of which a plurality of electrically conductive wires longitudinally extend, said cable having an end portion; and strain relief means for resiliently resisting torsional and transverse bending forces imposed on said cable end portion, said strain relief means including:

a hollow cylindrical body having a first end portion inwardly through which said cable end portion coaxially extends, said body having fixedly secured to the insulating jacket section of said cable end portion along generally the entire length of said body and having a second end portion axially spaced apart from said first end portion, and strain control means, externally secured to said body, for controlling the deformation of said body in a manner such that:

(1) said strain relief means are provided with a generally uniform bending resistance in all directions tranverse to said body; '(2) a generally linear relationship is maintained between the magnitude of a transverse bending force imposed on said cable end portion and the axial length of said body which, in response to the tranverse bending force, is bendingly deformed, said generally linear relationship being uniformly maintained generally irrespective of the direction of said transverse bending force, and (3) a generally linear relationship is maintained between the magnitude of a torsionsal force imposed on said cable end portion and the axial length of said body which, in response to the torsional force, is torsionally deformed.

11. The electrical cable apparatus of claim 10 wherein:

said body molded integrally with the jacket section of said cable end portion.

12. The electrical cable apparatus of claim 10 wherein said strain control means include:

a circumferentially spaced series of elongated ribs secured to, longitudinally extending along the length of, and projecting radially outer from the outward side surface of said body, said ribs being tapered along their lengths.

13. The electrical cable apparatus of claim 12 wherein:

said ribs have first ends positioned on said first end portion of said body and second ends positioned on said second end portion of said body, and said ribs taper radially outwardly from their first ends to their second ends.

14. The electrical cable apparatus of claim 13 wherein:

said ribs are radially tapered uniformly along their length.

15. The electrical cable apparatus of claim 10 further comprising:

a connector member secured to said second end portion of said body and being removably attachable to a complementarily configured connector member to conductively link the complementarily configured connector member to the wires in said cable end portion.

16. The electrical cable apparatus of claim 15 wherein:

said connector member has a connector body portion which is formed integrally with said body of said strain relief means.

17. A strain relief device for protecting an electrical cable end portion by resiliently resisting torsional and transverse bending forced imposed on said cable end portion comprising:

a generally tubular hollow body formed from a resilient material and adapted to coaxially receive and be fixedly secured to said cable end portion, said body having a first generally cylindrical sidewall section having first and second ends and an outer surface and a second, wider, generally cylindrical sidewall section having a first end secured to said first sidewall section and an outer surface; and a plurality of elongated ribs formed from a resilient material, each of said ribs having a bottom edge secured to said outer surface of said first sidewall section and a top edge, said ribs extending lengthwise between said first and second ends of said first sidewall section and projecting radially outwardly from said outer surface of said first sidewall section, said top edges of said ribs at said second end lying flush with said outer surface of said second sidewall section.

18. The strain relief device of claim 17 wherein each of said ribs has first and second ends and is progressively tapered between said first and second ends.

19. The strain relief device of claim 18 wherein said second end of each of said ribs is integrally formed with said second sidewall section.

20. The strain relief device of claim 19 wherein said plurality of ribs are circumferentially spaced around said outer surface of said first sidewall section.

* * * * *